Jan. 18, 1927.
C. T. RUNYON
1,615,138
CUSHIONING CONNECTION FOR SHAFTING
Filed July 27, 1926
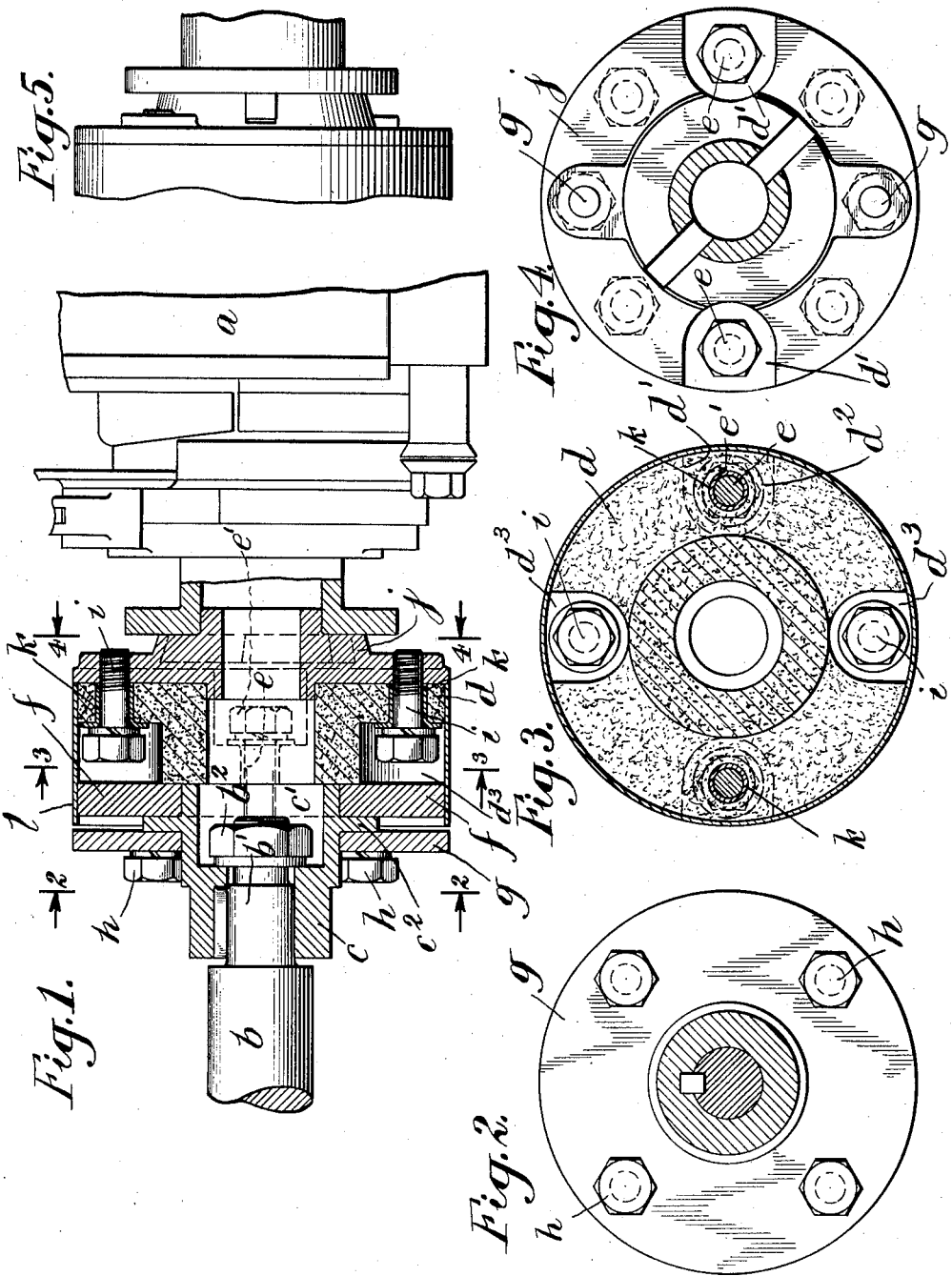
Inventor
Carroll Trow Runyon
By his Attorneys
Redding, Greeley, O'Shea & Campbell Patented Jan. 18, 1927.

1,615,138

UNITED STATES PATENT OFFICE.

CARROLL TROW RUNYON, OF PLAINFIELD, NEW JERSEY, ASSIGNOR TO INTERNATIONAL MOTOR COMPANY, OF NEW YORK, N. Y., A CORPORATION OF DELAWARE.

CUSHIONING CONNECTION FOR SHAFTING.

Application filed July 27, 1926. Serial No. 125,162.

This invention relates broadly to cushioning connections adapted to be operatively interposed between sections of shafting for the purpose of absorbing in whole or in part the shocks and vibrations set up in one of the shaft sections and thus prevent their transmission to the adjacent shaft section as well as of cushioning the torque between the respective shaft sections. More specifically the invention relates to a coupling involving non-metallic yielding material adapted to be interposed in a magneto drive for motor vehicles.

It has heretofore been proposed to incorporate non-metallic material in shaft couplings of various characters including the driving connections with magnetos from internal combustion engines. In respect of the coupling in magneto drives the use of non-metallic yielding material has not been entirely satisfactory since the disposition of parts has been such as to promote wear and deterioration of the yielding material with consequent loss of effectiveness in the operation of the coupling.

The present invention seeks to provide a coupling particularly applicable in connection with a magneto drive which shall promote the effectiveness of the coupling and contribute to the life and efficacy of the non-metallic yielding material involved, in a structure which shall be practical from the standpoint of manufacture and use. To this end spaced portions of an element of non-metallic yielding material are clamped respectively to elements of adjacent shaft sections to provide a cushioning connection therebetween, suitable provision being made for limiting the degree of clamping action to prevent the possibility of any destructive effect by an inexpert assembly. More specifically spaced portions of an annulus of non-metallic yielding material are recessed for the reception of the heads, say, of cap screws securing the annulus to metallic annuli clamping between them a flange formed on a hub to be keyed to one of the shaft sections and other spaced portions are similarly recessed upon the opposite face of the non-metallic annulus for the reception of the heads, say, of cap screws securing the said annulus to the metallic magneto coupling member. Bushings are disposed within the apertures in the non-metallic annulus through which the cap screws pass to limit the degree of compression exerted by the screws when the coupling is assembled. Preferably the non-metallic annulus is composed of rubber because of its advantageous properties. By placing the rubber under a degree of compression its resiliency, strength and wearing qualities are improved.

The invention will now be described in greater particularity in connection with the accompanying drawing illustrating a preferred embodiment thereof, in which:

Figure 1 is a view in side elevation and partly in vertical longitudinal section showing the cushioning connection according to the present invention interposed between an engine driven shaft and the magneto.

Figure 2 is a view in end elevation taken in the plane indicated by the line 2—2 in Figure 1, looking in the direction of the arrows, and showing the coupling.

Figure 3 is a transverse vertical sectional view taken in the plane indicated by the line 3—3 in Figure 1, looking in the direction of the arrows and showing cap screws securing the non-metallic annulus to the magneto coupling member.

Figure 4 is a view in end elevation looking from the right in Figure 1 and taken in the plane indicated by the line 4—4 of Figure 1 showing the magneto coupling member.

Figure 5 is a fragmentary view, in side elevation, showing the right hand end, as viewed in Figure 1, of the coupling according to the present invention.

The cushioning connection according to the present invention is shown as interposed between the magneto $a$ and a shaft $b$ driven by suitable gearing, not shown, from the engine. The torque cushioning and shock absorbing element comprises a disc or annulus $b$ of non-metallic yielding material whereof spaced portions are respectively secured to elements carried with the drive shaft and the magneto shaft. The end of shaft $b$ is reduced as at $b'$ to receive and have keyed thereto a cylindrical hub member $c$ formed with an axial recess $c'$ to receive the nut $b^2$ securing the hub to the shaft and with a peripheral flange $c^2$ to which the annulus $d$ of non-metallic yielding material is releasably secured in the following manner. The annulus $d$ is formed with a pair of diametrically disposed apertures $d'$ for the passage of cap screws $e$ threaded into tapped holes (not shown) in the metal clamping annulus $f$. Upon the face of the non-metallic annulus $d$ opposite to the clamping member recesses $d^2$ are formed as shown in dotted lines in Figure 3 for the reception of the heads $e'$ of the cap screws $e$. The metallic annulus $f$ forms one of a pair of clamping members $f$ and $g$ which, after the non-metallic annulus $d$ and the clamping member $f$ are assembled, are secured in clamping engagement with the hub flange $c^2$ by means of cap screws $h$ passing through apertures in the disc $g$ and threaded into tapped holes (not shown) in the disc $f$.

The non-metallic yielding annulus $d$ is similarly secured by cap screws $i$ to the coupling member $j$ carried in usual manner with the shaft of the magneto $a$. In this instance, the diametrically disposed recesses $d^3$ for the heads of the cap screws are in the opposite face of the disc $d$ from the recesses $d^2$.

The non-metallic annulus $d$ is preferably made of rubber and is retained under a degree of compression. By so retaining it, its strength, resiliency and wearing qualities are increased. If desired, the block $d$ may be made somewhat oversize so that upon insertion in the connection it will be compressed and its molecular activity increased. To prevent pinching of the non-metallic material by the cap screws $e$ and $i$ metallic bushings $k$ may be inserted in the holes through which the lag screws pass. These bushings permit the lag screws to exert a predetermined degree of compression upon the non-metallic material but prevent pinching of the material by an inexpert assembly.

For the protection of the non-metallic material against the effects of the atmosphere and as a shield for dirt and moisture an annular guard or shield $l$ is disposed about the discs $f$ and $d$.

It will thus be seen that a flexible coupling for shafting has been provided which is particularly applicable in connection with a magneto drive. In the coupling non-metallic yielding material is incorporated and retained under a predetermined degree of compression. Suitable provision is made for protecting the non-metallic material and limiting the degree of compression.

Various modifications may be made in the particular configuration and composition of the non-metallic element as well as in the co-operating parts and in the application of the device as a whole without departing from the spirit and scope of the invention.

What is claimed is:

1. In a cushion connection, the combination with a drive shaft and a magneto shaft, of a metallic hub carried with the drive shaft, a metallic coupling member carried with a magneto shaft, an annulus of non-metallic yielding material formed with diametrically disposed recesses upon opposite faces and apertured within the recesses and cap screws to secure the annulus to the hub and coupling member, respectively, the heads of said cap screws lying in the recesses.

2. In a cushion connection, the combination with a drive shaft and a magneto shaft, of a metallic coupling member carried with the magneto shaft, a hub formed with a flange and keyed to the drive shaft, a pair of metallic annuli concentric with the hub on opposite sides of the flange, cap screws to secure the annuli together in clamping relation with the flange, an annulus of non-metallic yielding material formed with diametrically disposed recesses upon opposite faces and apertured within the recesses, cap screws to secure the non-metallic annulus to one of the non-metallic annuli and to the metallic coupling member.

This specification signed this 16th day of July A. D. 1926.

CARROLL TROW RUNYON.